United States Patent
Paschek et al.

[19]

[11] Patent Number: 5,934,759
[45] Date of Patent: Aug. 10, 1999

[54] MEANS FOR MOVING A FITTING PART WITH AN INSERT TONGUE INTO AN ERGONOMICALLY FAVORABLE PRESENTATION POSITION

[75] Inventors: Joachim Paschek, Stuttgart; Dieter Biller, Alfdorf-Brech; Jürgen Petzi, Geislingen-Eybach, all of Germany

[73] Assignee: TRW Occupant Restraint Systems GmbH, Alfdorf, Germany

[21] Appl. No.: 08/901,755

[22] Filed: Jul. 28, 1997

[30] Foreign Application Priority Data

Aug. 2, 1996 [DE] Germany ..................... 296 13 427 U

[51] Int. Cl.$^6$ .................................................. A47C 31/00
[52] U.S. Cl. ............................................ 297/481; 297/483
[58] Field of Search ................................ 297/481, 483, 297/469; 280/808, 802, 801.1, 801.2, 804

[56] References Cited

U.S. PATENT DOCUMENTS

| | | |
|---|---|---|
| 4,496,170 | 1/1985 | Sasaki et al. .................... 297/481 X |
| 4,679,821 | 7/1987 | Yamamoto et al. .............. 297/481 X |
| 4,775,167 | 10/1988 | Schiller et al. . |
| 4,919,488 | 4/1990 | Deegener et al. ................ 297/481 X |
| 5,261,696 | 11/1993 | Hamaue . |
| 5,431,446 | 7/1995 | Czarnecki et al. . |

FOREIGN PATENT DOCUMENTS

| | | | |
|---|---|---|---|
| 2710754 | 9/1977 | Germany | ........................... 297/481 |
| 3616452 | 11/1987 | Germany . | |
| 2171892 | 9/1986 | United Kingdom . | |

*Primary Examiner*—Laurie K. Cranmer
*Attorney, Agent, or Firm*—Tarolli, Sundheim, Covell, Tummino & Szabo

[57] ABSTRACT

A means for moving a fitting part with an insertion tongue of a vehicle seat belt from a resting position, suitable for a vehicle occupant getting in and out of the vehicle, into an ergonomically favorable presentation position in which the occupant is easily able to grasp the fitting part, includes a stirrup handle gripping the seat belt, a swivel arm to which the stirrup handle is applied and a drive for moving the swivel arm between the resting position and the presentation position.

13 Claims, 6 Drawing Sheets

MEANS FOR MOVING A FITTING PART WITH AN INSERT TONGUE INTO AN ERGONOMICALLY FAVORABLE PRESENTATION POSITION

TECHNICAL FIELD

The invention relates to a means for moving a fitting part with an insert tongue of a vehicle seat belt from a resting position into an ergonomically favorable presentation position.

BACKGROUND OF THE INVENTION

A known means employs a rail guide extending from the B-pillar into the side roof pillar. After entry of the occupant a slider with the stirrup handle thereon runs on the rail up to forwards of his head where the occupant is able to easily grasp the fitting part resting on the stirrup handle to buckle up without having to twist the upper part of his body.

A further known means comprises a linear guide integrated in the region of the B-pillar in the sidewall of the vehicle. After getting in of the occupant a rod is moved linearly forwards out of the side trim to present the stirrup handle up to forwards of the occupant's shoulder. This known means is expensive and requires relatively much room in the region of the B-pillar so that it heavily restricts the spatial configuration of the sidewall region between the B-pillar and the C-pillar.

BRIEF DESCRIPTION OF THE INVENTION

The invention defines a simpler and more cost-effective means which can be easily adapted to differing installation situations without this restricting the function of the means. The means according to the invention is a compact structure permitting its individual parts to be accommodated at locations in the vehicle which are remotely spaced from each other. The means according to the present invention for moving a fitting part with an insertion tongue of a vehicle seat belt from a resting position, suitable for a vehicle occupant getting in and out of the vehicle, into an ergonomically favorable presentation position in which the occupant is easily able to grasp the fitting part, includes a stirrup handle gripping the seat belt, a swivel arm to which the stirrup handle is applied and a drive for moving the swivel arm between the resting position and the presentation position. Due to the swivel mount provided for, a relatively large adjustment movement at the free end of the swivel arm is achievable by very slight feed movements which is an additional space-saving feature. Moreover, the swivel mount is achievable by various drive concepts, thus making it possible to accommodate the drive remote from the mount should the space-availability situation in the vehicle call for this.

The swivel arm may be mounted, irrespective of the type of vehicle involved, in the region of the B-pillar, in the region of the vehicle seat on the side thereof or on a longitudinal beam of the vehicle frame.

The drive in one aspect of the invention is an eccentric drive in which preferably the eccentricity of the follower provided is adjustable.

In a further advantageous embodiment the drive is coupled to a slide rod pivoted to the swivel arm. By using the slide rod the spacing between the swivel mount and the drive may be particularly great. Preferred possibilities are provided for varying the position of the swivel range and the swivel angle thereof so that the means may be adapted to another type of vehicle without using basically different parts.

DETAILED DESCRIPTION OF PREFERRED EMBODIMENTS

Figure 1:
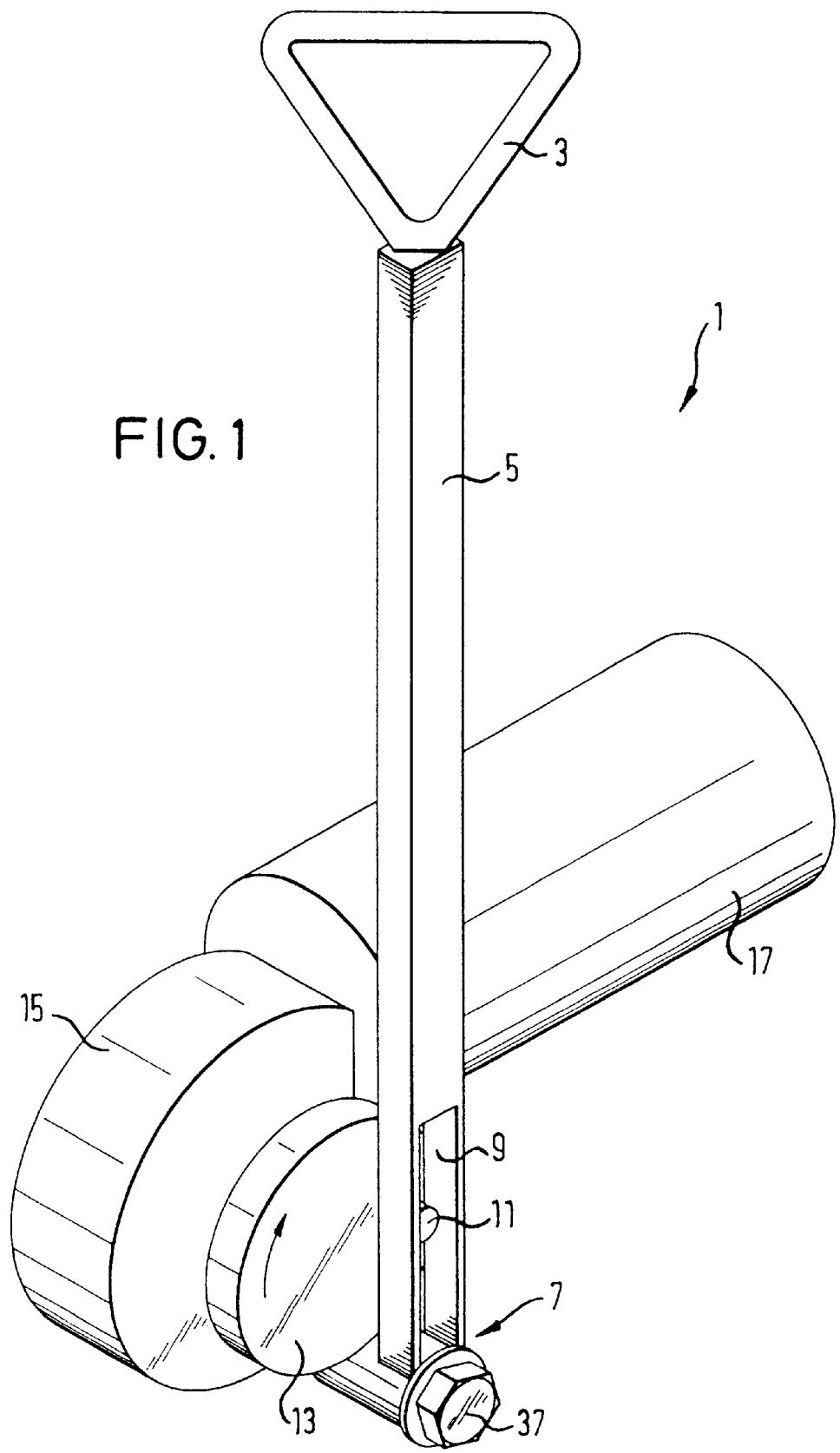
FIG. 1 shows a first embodiment of the means according to the invention including an eccentric drive.

Like components in the various embodiments are identified by like reference numerals.

In FIG. 1 a first embodiment of a means 1 is shown which guides an insert tongue (not shown) of a vehicle seat belt from a resting position, suitable for the vehicle occupant getting in and out of the vehicle, into an ergonomically favorable presentation position. In the presentation position the occupant is able to grip the fitting part provided with the tongue easier for buckling up. The means comprises a stirrup handle 3 in the form of a triangle through which the seat belt runs. In this arrangement the stirrup handle 3 is always arranged below the fitting part sliding on the seat belt so that in the resting position shown in FIG. 1 the fitting part is able to slide up to the stirrup handle 3 to come into contact therewith. The stirrup handle 3 is secured to the free end of a swivel arm 5. The opposite end of the swivel arm 5 may be pivoted via a swivel mount 7 on the vehicle. A recess in the swivel arm 5 in the region of the swivel mount 7 forms a guide slot 9 for a follower 11 secured eccentrically to a disc 13. The disc 13 is caused to rotate by an electric drive 17 via an eccentric mechanism 15. The resulting eccentric drive provides for swivelling of the arm 5 and thus for a shift in position of the stirrup handle 3 with the seat belt along with the fitting part located on the stirrup handle 3 into an ergonomically favorable presentation position as soon as the occupant is seated in the vehicle.

In the case of the eccentric drive illustrated in FIG. 1 the electric motor provided is able to run always in the same direction of rotation. In a rotation of the disc 13 the stirrup handle 3 is moved from the resting position into the presentation position and back. For adjusting the angle of swivel the eccentricity of the follower 11 on the disc 12 is adjustable. In addition to this it may be provided for that the spacing of the middle axes of disc 13 and swivel mount 7 is adjustable, as a result of which the angle of swivel and also the torque of the swivel arm 5 can be adapted accordingly.

Figure 2:
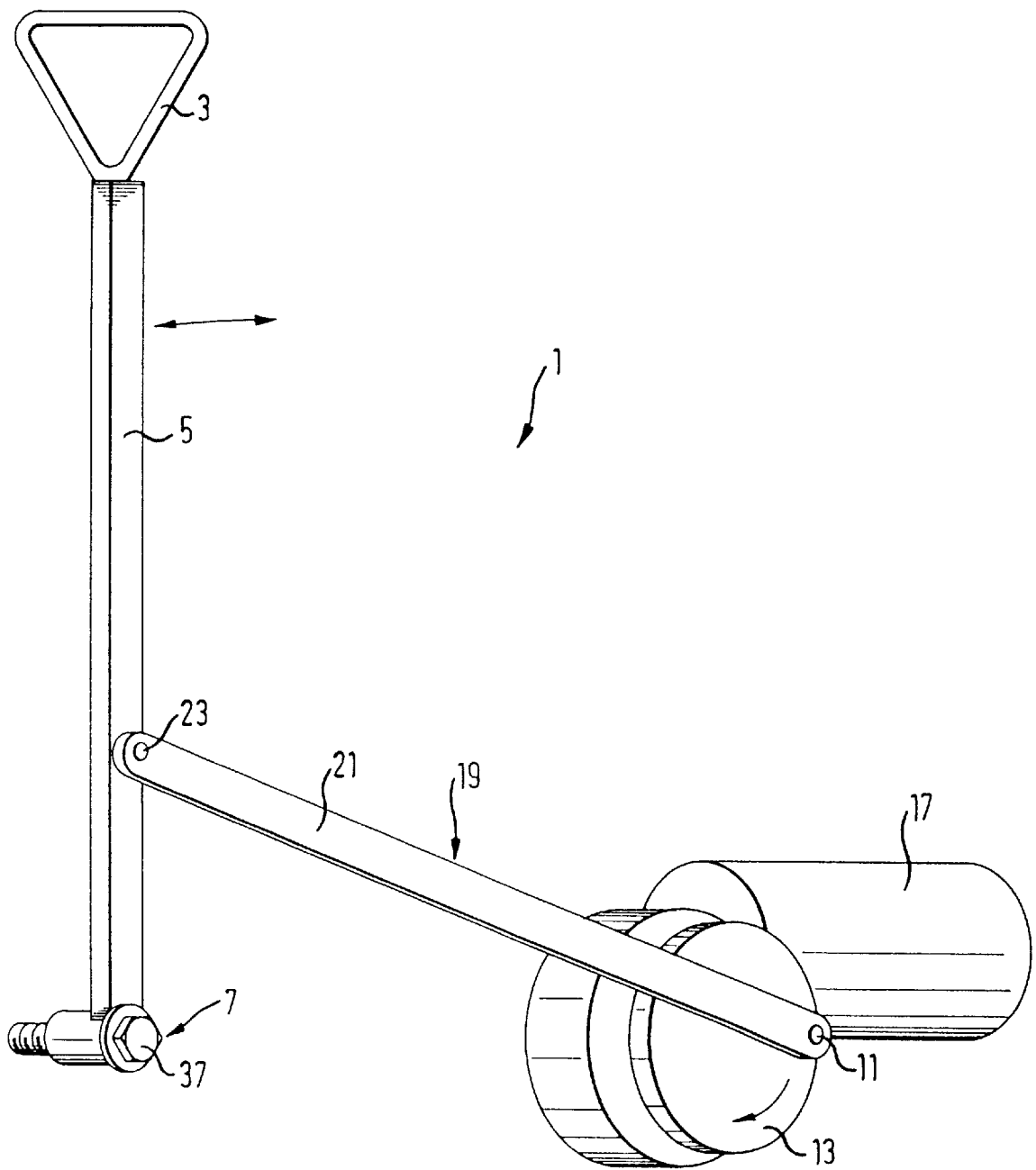
FIG. 2 shows a second embodiment of the means according to the invention including a slider-crank mechanism.

In the embodiment of the means 1 shown in FIG. 2 a slider-crank mechanism 19 is provided. A slide rod 21 is swivably mounted at one end to a pivot point 23 on the swivel arm 5 and at the other end to the follower 11 of the disc 13. The positions and the swivelling angle of the swivel arm 5 can be varied by altering the pivot point 23 and the eccentricity of the follower 11. In addition to this it is possible to configure the slide rod 21 adjustable in length which is not shown, in FIG. 2, however. Also in the case of the embodiment shown in FIG. 2 the drive 17 is always able to run in one direction of rotation.

It is not mandatory that the swivel arm 5 is configured as a single-arm lever, it may also form an arm of a two-armed lever at the other arm of which the drive engages.

Figure 3:
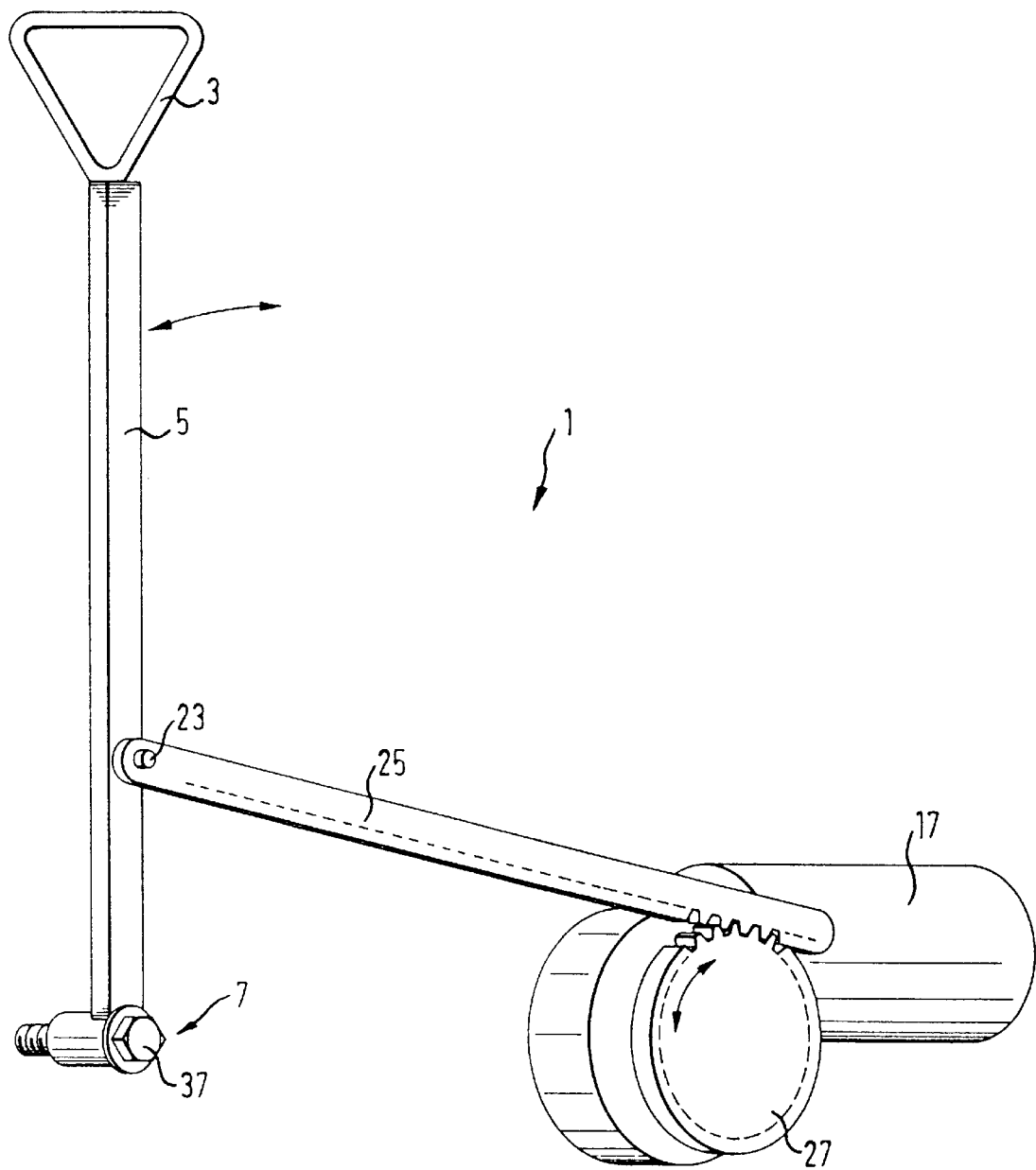
FIG. 3 shows a third embodiment of the means according to the invention including a gear rack as the slider crank.

The embodiment shown in FIG. 3 differs from that shown in FIG. 2 by the slide rod being configured as a toothed rack 25 and the disc as a pinion 27. At the pivot point 23 the toothed rack 25 is coupled to the swivel arm 5 and at the other end the toothing of the toothed rack 25 engages the toothing of the pinion 27. To return the stirrup handle 3 to the resting position from the presentation position in this embodiment it is, however, necessary to alter the direction of rotation of the drive 17. By configuring the toothing accordingly the speed at which the swivel arm 5 is swivelled can be additionally influenced.

Figure 4:
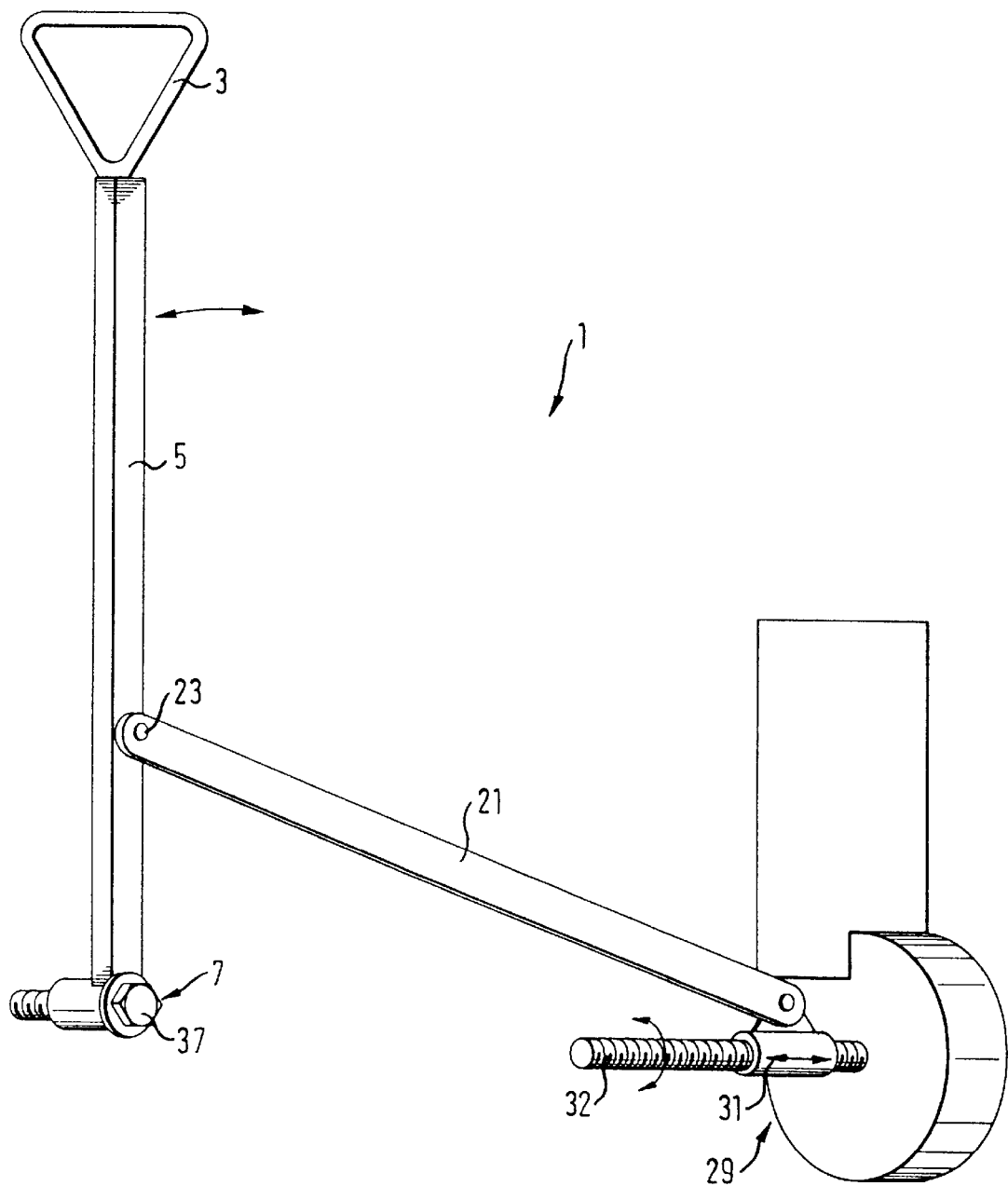
FIG. 4 shows a fourth embodiment of the means according to the invention including a spindle drive.

In the embodiment shown in FIG. 4 the use of the slide rod 21 is likewise provided for which in this case, however, it is shifted by a spindle drive 29. For this purpose the slide rod 21 is secured at its drive end swivably to a spindle nut 31 which is seated on a spindle 32. Since the spindle nut 31 is prevented from rotating by the slide rod 21 it is shifted axially by rotation of the spindle 32, depending on direction of rotation. In this embodiment, too, the electric motor provided as the drive 17 must be capable of rotating reversibly.

In contrast to the embodiment shown in FIG. 1 the drive 17 in the case of the other embodiments is located more remotely from the swivel arm 5 by the slide rod 21 or the toothed rack 25 being provided. Accordingly, the drive 17 together with the eccentric mechanism 15 as may be necessary can be incorporated in positions on the vehicle at which accommodating the relatively bulky drive 17 is facilitated.

Especially in the region of the B-pillar the space available for incorporating the means 1 is relatively cramped, due to a belt retractor and, where necessary, a belt tensioner being provided here.

Possible situations for incorporating the means 1 are depicted in FIGS. 5 to 8.

Figure 5:
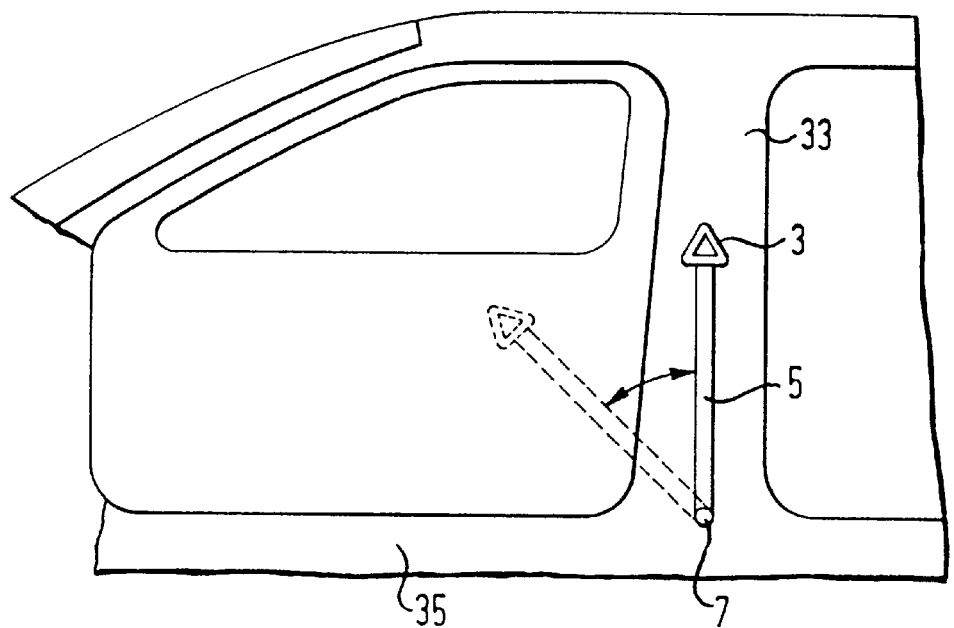
FIGS. 5 to 8 show mounting variations of the means according to the invention.

In FIG. 5 the swivel arm 7 is disposed in the region of transition of the B-pillar 33 and the longitudinal beam. The swivel mount 7 is secured simply by means of the bolt 37, shown in FIGS. 1 to 4, to the vehicle frame. In the resting position, with the vehicle parked, the swivel arm 5 extends parallel to the B-pillar 33. When, however, the occupant has got in, the swivel arm 5 swivels forward, due to the action of the drive 17, into the presentation position depicted by broken lines in which the fitting part located on the stirrup handle 3 is easily attainable for the occupant when buckling up. Subsequently, the swivel arm 5 is returned to the resting position which it also assumes when the vehicle is on the move.

Figure 6:
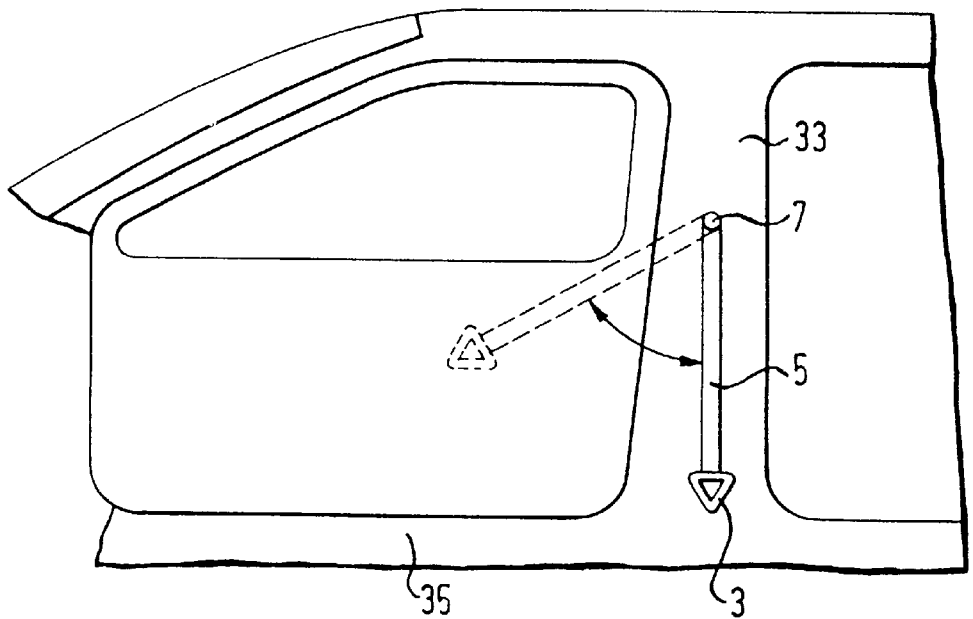

In the case of the variant incorporated as shown in FIG. 6 the swivel mount 7 is provided in the upper region of the B-pillar from which the swivel arm 5 extends downwards and is swivelled upwards at an angle into the presentation position.

Figure 7:
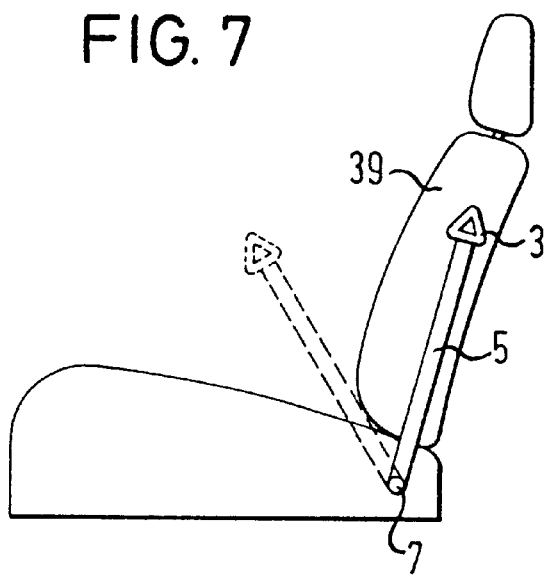

The means 1 shown may also be part of a vehicle seat as is evident from FIG. 7. The swivel mount 7 is secured to the seat frame (not shown) below the backrest 39. From the resting position in which the swivel arm 5 runs parallel to the backrest 39 the swivel arm is moved into the presentation position in which it is disposed to one side forwards of the midriff region of the occupant. This variant for incorporating the means has the advantage that the means 1 is included in displacing the vehicle seat forwards or to the rear and the fitting part is readily attainable likewise for vehicle occupants large or small in stature.

Figure 8:
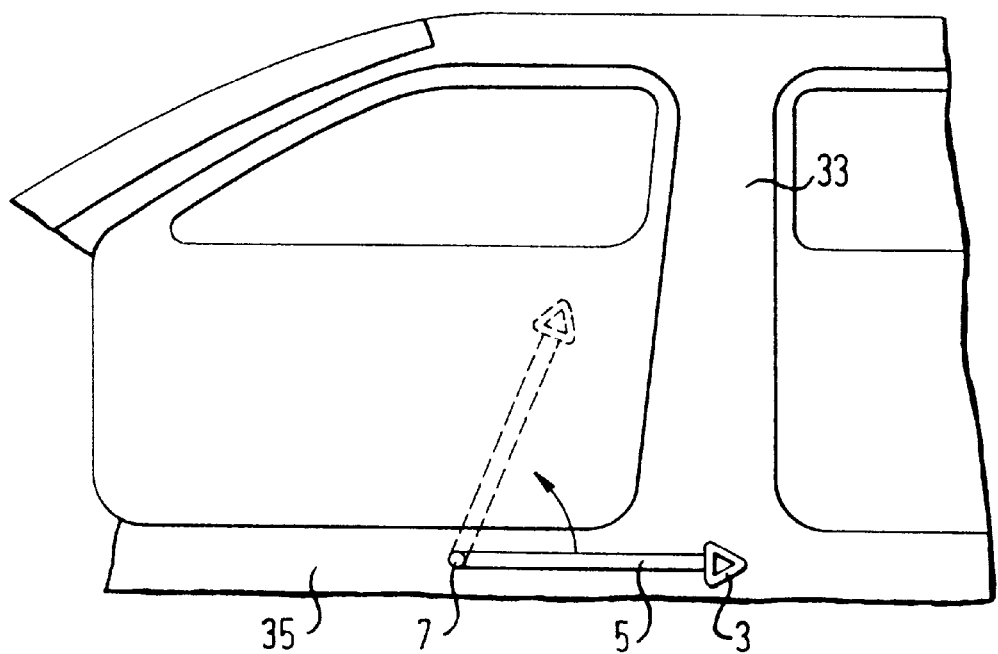

In the case of the embodiment illustrated in FIG. 8 the swivel arm 5 is secured to the longitudinal beam 35 forwards of the B-pillar, it extending in the resting position parallel to the longitudinal beam 35 forwards or, as shown in FIG. 8, rearwards. After the occupant has got in, the swivel arm 5 is brought into roughly a vertical position.

We claim:

1. A means for moving a fitting part with an insertion tongue of a vehicle seat belt from a resting position, suitable for a vehicle occupant getting in and out of the vehicle, into an ergonomically favorable presentation position in which said occupant is easily able to grasp said fitting part, including a stirrup handle gripping said seat belt, a swivel arm to which said stirrup handle is applied, a drive for moving said swivel arm between said resting position and said presentation position and a slide rod having two opposite ends and a pivot point, said slide rod being pivoted at one end onto said swivel arm at said pivot point and at the other end engaging said drive, said drive moving said slide rod and said swivel arm between said resting position and said presentation position, at least one of the length of said slide rod and the position of its pivot point on said swivel arm being adjustable.

2. The means set forth in claim 1, wherein said slide rod has a second pivot point and is eccentrically connected at said second pivot point to said drive to define an eccentric drive.

3. The means as set forth in claim 2, wherein the eccentricity of said second pivot point of said slide rod at said drive is adjustable.

4. The means set forth in claim 2, wherein a slider crank mechanism is provided, said mechanism including a disc which is caused to be rotated by said drive, and said slide rod being pivotally and eccentrically mounted at said second pivot point to said disc.

5. The means as set forth in claim 4, wherein the eccentricity of said second pivot point of said slide rod at said disc is adjustable.

6. The means as set forth in claim 1, wherein said vehicle has a B-pillar and wherein said swivel arm is mounted to said vehicle in the region of said B-pillar and can be swiveled downwards or upwards into said presentation position.

7. The means as set forth in claim 1, wherein said vehicle has a vehicle seat and said swivel arm is mounted in the lower region of said vehicle seat on one side thereof.

8. The means as set forth in claim 1, wherein said vehicle has a vehicle frame with a longitudinal beam and wherein said swivel arm is mounted on the longitudinal beam.

9. The means as set forth in claim 1, wherein a driven pinion is provided and said slide rod is configured as a toothed rack, each of said pinion and said slide rod having a toothing, said slide rod engaging at one end by its toothing said toothing of said driven pinion.

10. The means as set forth in claim 1, wherein said drive includes a spindle nut with an associated spindle, said spindle nut being capable of linear travel, said slide rod having a second pivot point and being pivoted at said second pivot point to said spindle nut.

11. A means for moving a fitting part with an insertion tongue of a vehicle seat belt from a resting position, suitable for a vehicle occupant getting in and out of the vehicle, into an ergonomically favorable presentation position in which said occupant is easily able to grasp said fitting part, including a stirrup handle gripping said seat belt, a swivel arm to which said stirrup handle is applied and an eccentric drive for moving said swivel arm between said resting position and said presentation position, the eccentricity of said drive being adjustable.

12. The means as set forth in claim 11, wherein said drive includes a disc with a follower applied eccentrically to said disc and wherein said swivel arm has a guide slot engaged by said follower, said drive causing said disc to be rotated.

13. The means as set forth in claim 11, wherein a slider crank mechanism having a slide rod is provided, wherein a disc is provided which is caused to be rotated by said drive, said drive being coupled to said mechanism, said slide rod being eccentrically and pivotally mounted at one end to said disc and wherein said eccentricity is adjustable.

* * * * *